(12) United States Patent
Diehl

(10) Patent No.: US 8,132,201 B2
(45) Date of Patent: Mar. 6, 2012

(54) PROCESS FOR TRANSMITTING DIGITAL DATA REPRESENTATIVE OF A CONTENT

(75) Inventor: Eric Diehl, Liffré (FR)

(73) Assignee: Thomson Licensing, Boulogne-Cedex (FR)

( * ) Notice: Subject to any disclaimer, the term of this patent is extended or adjusted under 35 U.S.C. 154(b) by 1582 days.

(21) Appl. No.: 10/358,613

(22) Filed: Feb. 5, 2003

(65) Prior Publication Data

US 2003/0149974 A1 Aug. 7, 2003

(30) Foreign Application Priority Data

Feb. 6, 2002 (FR) ..................................... 02 01568

(51) Int. Cl.
*H04N 7/16* (2011.01)
*H04N 7/167* (2011.01)

(52) U.S. Cl. .......... 725/25; 380/200; 380/201; 380/202; 380/203

(58) Field of Classification Search ................. 725/25, 725/80; 726/29; 705/51–55; 380/200–203
See application file for complete search history.

(56) References Cited

U.S. PATENT DOCUMENTS

| | | | |
|---|---|---|---|
| 5,778,068 A * | 7/1998 | Johnson et al. ............... 713/189 |
| 5,832,119 A | 11/1998 | Rhoads | |
| 6,249,532 B1 * | 6/2001 | Yoshikawa et al. .......... 370/486 |
| 6,256,390 B1 * | 7/2001 | Okuyama et al. ............. 380/201 |
| 6,381,747 B1 * | 4/2002 | Wonfor et al. ................ 725/104 |
| 6,442,328 B1 * | 8/2002 | Elliott et al. .................... 386/46 |
| 6,452,952 B1 * | 9/2002 | Okuhara ........................ 370/536 |
| 6,751,402 B1 * | 6/2004 | Elliott et al. ..................... 386/83 |
| 6,912,513 B1 * | 6/2005 | Candelore ....................... 705/51 |
| 6,973,662 B1 * | 12/2005 | Sie et al. ......................... 725/25 |
| 6,983,480 B1 * | 1/2006 | Sie et al. ......................... 725/25 |
| 7,043,138 B1 * | 5/2006 | Wakahara et al. ............ 386/239 |
| 7,233,948 B1 * | 6/2007 | Shamoon et al. ................ 707/9 |
| 7,412,606 B2 * | 8/2008 | Asano et al. ................... 713/193 |
| 7,434,056 B2 * | 10/2008 | Belenko et al. ............... 713/176 |

FOREIGN PATENT DOCUMENTS

| | | | |
|---|---|---|---|
| EP | 0 969 462 | | 1/2000 |
| KR | 2001-0073905 | * | 3/2001 |
| KR | 2001-0073905 B1 | | 3/2001 |

* cited by examiner

*Primary Examiner* — Brian Pendleton
*Assistant Examiner* — Jean D Saint Cyr
(74) *Attorney, Agent, or Firm* — Robert D. Shedd; Vincent E. Duffy; Joel M. Fogelson

(57) ABSTRACT

The process comprises the steps consisting in:
(a) receiving data in a first device, the data containing at least one anticopy protection system identifier;
(b) verifying whether the first device is connected to a data recording device by a digital bus; and in case of positive verification:
(c) verifying whether the first device comprises a module implementing an anticopy protection system whose identifier is included in the data; and in case of positive verification:
(d) offering a user access to the data according to a first mode of access (PPVR) authorizing the recording of the data; and
in case of negative verification in step (b) or step (c):
(e) offering a user access to the data according to a second mode of access (PPV) not authorizing the recording of the data.

13 Claims, 2 Drawing Sheets

PROCESS FOR TRANSMITTING DIGITAL DATA REPRESENTATIVE OF A CONTENT

FIELD OF THE INVENTION

The present invention pertains to the field of the broadcasting of data representative of contents, such as audiovisual data. It relates also to the field of the protection of such data against copying, in particular in a digital home network environment.

BACKGROUND ART

It is currently known to broadcast audiovisual programmes (for example films or retransmissions of sports events) according to a so-called "Pay Per View" (PPV) mode of access. This mode of access allows a user to view a film or a particular event once on payment of a specified price. This mode of access is generally offered in addition to a subscription taken out by the user with the broadcaster who gives him the right to access a certain number of broadcast programmes on payment of his subscription.

In order that the programmes be received only by the users who have paid to receive them, they are generally protected by a so-called conditional access system in which the broadcast data are scrambled in a manner well known per se.

For their part, content providers, for example film producers, want it not to be possible to unrestrictedly copy broadcast data, especially the data broadcast in PPV mode.

This is why anticopy protection systems have already been proposed in the past in which a state "copy free", "one (or N) copy (copies) authorized", "private copy authorized" or "copy never" is associated with the broadcast data. These states may naturally be slightly different from one protection system to another. The data broadcast in PPV mode generally have the "copy never" state, that is to say any recording device possessing an anticopy protection system must not agree to record them, or at least if the data are recorded, it must not be possible to play them back subsequently.

SUMMARY OF THE INVENTION

The present invention aims to offer a novel mode of possible access to broadcast data while guaranteeing the data providers equally reliable protection against the copying of these data.

The invention relates accordingly to a process for transmitting data representative of a content which comprises the steps consisting in:

(a) receiving data in a first device, said data containing at least one anticopy protection system identifier;

(b) verifying whether the first device is connected to a data recording device by a digital bus; and in case of positive verification:

(c) verifying whether the first device comprises a module implementing an anticopy protection system whose identifier is included in said data; and in case of positive verification:

(d) offering a user access to the said data according to a first mode of access authorizing the recording of the said data; and
in case of negative verification in step (b) or step (c):

(e) offering a user access to the said data according to a second mode of access not authorizing the recording of the said data.

The first mode of access preferably corresponds to a mode which will be called "Pay Per View and Record" (PPVR) according to which the broadcast data are recorded by a recording device at the same time as they are viewed by the user (the user is not however compelled to view the data at the same time as they are recorded). According to this mode of access, the user can thus access the recorded data as often as he wants. Moreover, this mode is offered only when the device which receives the data comprises an anticopy protection system which is agreed by the data broadcaster (and/or the content provider). The provider of the content and the broadcaster of the data representing this content may be the same but they are usually two different entities. The anticopy protection system(s) identifier or identifiers which are included in the broadcast data are preferably defined by the data broadcaster (possibly under the control of the content provider).

Thus, the data broadcaster (and the content provider) is assured that the copy made within the framework of a protection system which it knows will only be usable by the user who has been authorized to make it for payment.

The second mode of access preferably corresponds to the conventional PPV mode.

According to a particular embodiment of the invention, the process furthermore comprises the step consisting, in case of positive verification in step (c):

(i) in verifying whether the anticopy protection system belongs to a first category of systems using a mode of protection specific to the digital bus connecting the first device to the recording device, and in case of positive verification:

(j) in verifying whether at least one recording device to which the first device is connected comprises a module implementing the same anticopy protection system;

step (d) being implemented in case of positive verification in step (j) or of negative verification in step (i);

and step (e) being implemented in case of negative verification in step (j).

There are in fact two major categories of anticopy protection systems in home network environments:

systems associating a local protection with each type of appliance of the network (a particular encryption type, a conditional access system, etc) with a "protection of the link" (or protection of the bus) connecting the appliances together; in this type of method, the data may be available as plaintext inside the appliances but are never available as plaintext on the digital bus connecting together the various appliances of the network; the data are in fact re-encrypted before being transmitted over the bus;

so-called "end-to-end" protection systems in which the data are protected, in particular by being encrypted/scrambled as soon as they enter a point of the network and until the moment they are restored to the user (for example by video display on a television screen); the data are therefore never available as plaintext in the network, whether this be on the digital bus connecting the appliances together or in the appliances themselves, except at the eventual moment of their restoration, generally in analogue form, to the user.

When the anticopy protection system implemented in the first device belongs to the first category above, there is therefore provision, according to the preferred embodiment of the invention, to verify whether at least one recording device which is connected to the first device by a digital bus implements the same anticopy protection system. It is only in the case where this verification is positive that the PPVR mode of access will be offered to the user.

According to a preferred characteristic of the invention, the process furthermore consists, during step (d), in offering the user access to the data according to the second mode of access not authorizing the recording of the data. The user therefore has the choice, when the data reception data which it uses comprises an anticopy protection system recognized as reliable by the data broadcaster, between the PPVR mode of access and the PPV mode of access.

According to another characteristic of the invention, an option of purchase of the data according to the first mode of access to the data is offered to the user after a presentation of the data to the user. Thus, the user's choice is made in two stages: in a first stage, he chooses to view and/or listen to the data (if it is audiovisual data) and in a second stage, if he was pleased with this presentation of the data, he chooses to record them for his future use.

The invention can furthermore exhibit one or more of the following characteristics:
- access to the data according to the first mode of access is offered in return for the payment of a price corresponding to a first amount included in a first field contained in the data;
- access to the data according to the second mode of access is offered in return for the payment of a price corresponding to a second amount included in a second field contained in the data;
- the second amount is less than the first amount; the first and second amounts are preferably defined by the data broadcaster or by the content provider;
- the anticopy protection system identifier is included in a part of the received data which is protected by encryption or by authentication;
- the data are broadcast, when the user selects the mode of access offered in step (d), with an associated state which is defined in a third field included in the data.

It will also be noted that the invention applies to the case where the first device and at least one recording device are implemented by separate appliances connected to a digital network, in particular a digital home network. The invention applies also to the case where the first device intended for receiving the data and a recording device are included in one and the same appliance while being connected together by a digital bus. Such an appliance is for example a digital decoder comprising a hard disk for recording the data.

BRIEF DESCRIPTION OF THE DRAWINGS

The invention will be better understood on reading the description which follows, given merely by way of example and while referring to the appended drawings in which.

DESCRIPTION OF THE PREFERRED EMBODIMENTS

Figure 1:
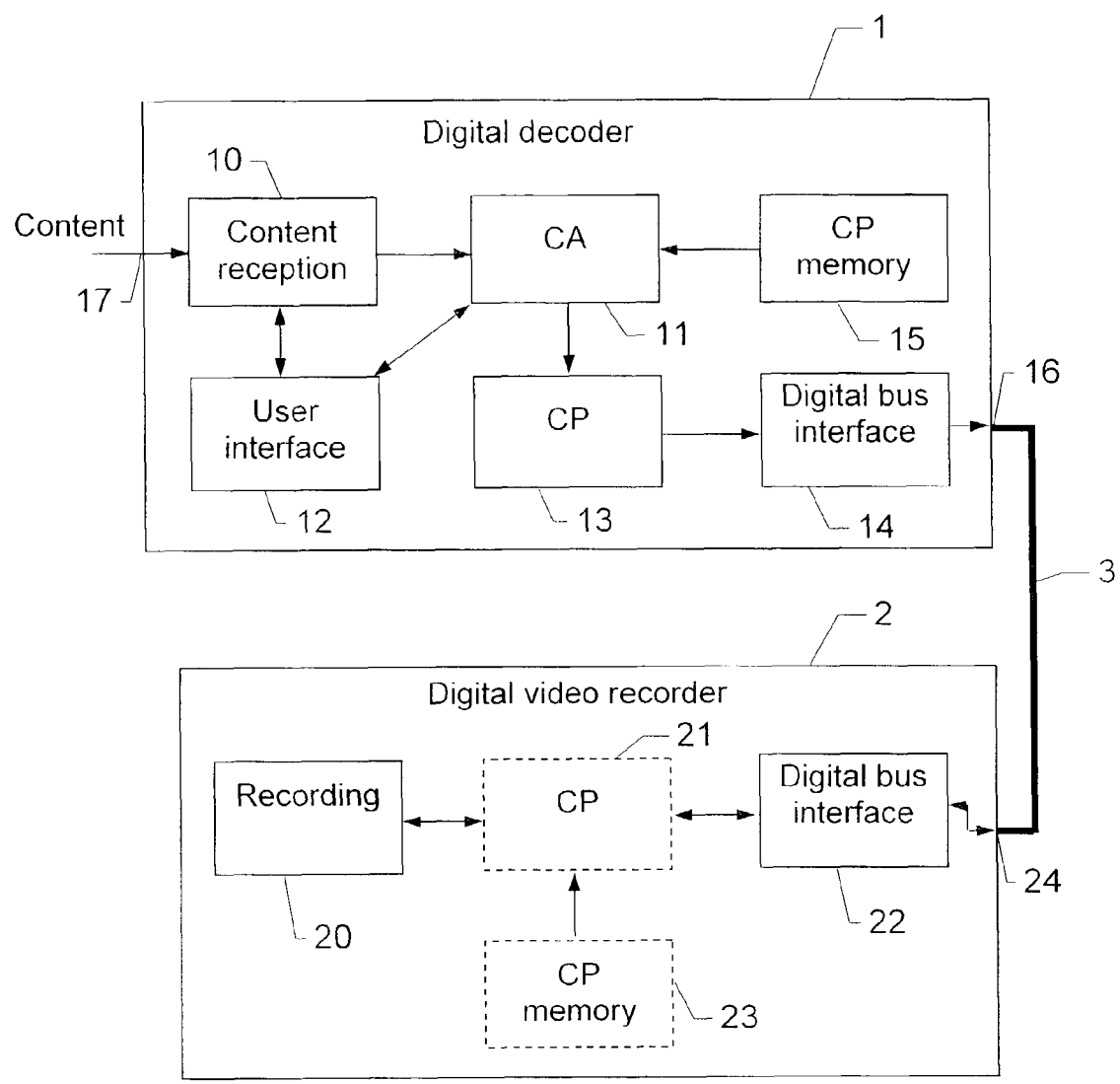
FIG. 1 diagrammatically represents a system in which the invention is implemented.

In FIG. 1 we have represented a digital decoder 1 which is connected to a digital video recorder 2 by way of a digital bus 3, for example a bus according to the IEEE 1394 standard.

On its analogue input 17 the digital decoder 1 receives a broadcast content. The decoder is for example connected to a satellite antenna or to a cable network for receiving broadcast programmes. The data representative of the content are coded in the form of digital data packets but they are subsequently modulated and transmitted in analogue form for their broadcasting.

The decoder 1 comprises a content reception module 10 which demodulates the analogue data received and recovers the digital data packets. It subsequently transfers these data packets to a conditional access module (CA module) 11 which verifies that the user possesses the rights to access the content received. This type of module is well known per se. It may for example implement the MediaGuard™ conditional access system (MediaGuard™ is a registered trade mark of the company Canal+) or the Viaccess™ system (Viaccess™ is a registered trade mark of the company France Telecom).

When the CA module 11 has verified that the user has the right to access the data received, it transmits the data packets to an anticopy protection module (CP module) 13. This module implements one or more anticopy protection systems, in particular the SmartRight™ system (SmartRight™ is a registered trade mark of the company THOMSON multimedia) or the "DTCP" system ("DTCP" is an acronym of "Digital Transmission Content Protection", also known by the name "5C", further details of which may be found in the publication "5C Digital Transmission Content Protection White Paper", Rev. 1.0, Jul. 14, 1998, available at the following Internet address http://www.dtcp.com/).

The decoder 1 comprises a memory 15 (CP memory) in which is stored a list of the anticopy protection systems implemented in the decoder. It is assumed that each anticopy protection system possesses a unique reference number and that the memory 15 contains the reference numbers of the anticopy protection systems supported by the decoder. The CA module 11 can consult the CP memory 15 to ascertain the anticopy protection systems implemented in the decoder.

Preferably, the CA module 11 and CP module 13 and the CP memory 15 are included in one or more secure processors, for example contained in a smart card. In this case, the decoder comprises a smart card reader and the diagram of FIG. 1 is embodied when the smart card is inserted into the decoder.

The CP module 13 receives from the CA module 11 the packets of data representative of the content received and it transforms them according to the anticopy protection system implemented (for example by encrypting them or by encrypting only certain messages contained in these packets) before transmitting them to a digital bus interface 14 which broadcasts them, via the digital output port 16 of the decoder, over the bus 3.

The decoder also comprises a user interface module 12 which manages the dialogue between the various applications of the decoder and the user, for example for the selecting of the programmes received or to display messages intended for the user and to receive his responses.

For its part the digital video recorder 2 contains a conventional recording unit 20 and a digital bus interface 22 which receives data from the digital port 24 connected to the bus 3. It also optionally contains an anticopy protection module (CP module) 21 and a memory 23 (CP memory) containing a list of the anticopy protection systems implemented in the video recorder 2.

The CP module 21 and the CP memory 23 are optional since, as will be seen hereinbelow, for a first category of anticopy protection systems, it is necessary to perform a processing on the data at the level of the decoder 1, that is to say before the sending of the data over the digital bus 3, and at the level of the video recorder 2, that is to say before the recording of the data, whilst for a second category of anticopy protection systems, so-called "end-to-end" protection systems, it is not necessary to perform any processing on the data received from the digital bus by the video recorder 2.

When the CP module 21 and the CP memory 23 are present in the digital video recorder 2, it is necessary for at least one anticopy protection system which is common with those supported by the digital decoder 1 to be implemented in the CP module 21 so that the decoder can offer the user access to the data in "Pay Per View & Record" (PPVR) mode as we shall see hereinbelow. When at least one common anticopy protection system is implemented in the decoder 1 and in the video recorder 2, then the data received from the digital bus interface 22 are processed in the CP module 21 before being transmitted to the recording unit 20. For example the processing consists in a decrypting of data or a decrypting of certain messages contained in the data.

When a programme broadcaster wants to offer a content in PPV or PPVR mode, he inserts the following information into the broadcast data:

```
PPVR_data = {
            PPV_price
            PPVR_price
            Number_CP_systems
            for i = 1 to Number_CP_systems {
                        CP_reference
                        CP_state
            }
}
```

The field PPV_price indicates the price of the content in PPV mode, that is to say when the user can only view the content once. The field PPVR_price indicates the price of the content in PPVR mode, that is to say when the user can also record the content so as to view it as often as he wants. Naturally, the price PPVR_price is in principle higher than the price PPV_price.

The field Number_CP_systems indicates the number of anticopy protection systems which are regarded as reliable by the data broadcaster (or by the content provider). This number is in principle never zero. For each anticopy protection system regarded as reliable, a field CP_reference indicates the reference number of the system. This number is for example defined by a trusted third party in such a way that all those involved—programme broadcasters, content providers, manufacturers of decoder appliances or of video recorders or else providers of anticopy protection systems—share the same reference numbers. The reference numbers indicated in the fields CP_reference are the same as those which are stored in the CP memories 15 of the decoder 1 and 23 of the video recorder 2.

The item PPVR_data also contains for each anticopy protection system regarded as reliable, a field CP_state which defines which state, specific to the protection system, must be associated with the data transmitted when the PPVR mode is chosen. For example, if the SmartRight™ system is considered, the state chosen for transmitting the data in PPVR mode is the "private copy" state authorizing the copying of the data solely for the private use of the user in his domestic network.

Preferably, the item PPVR_data is protected, by encryption or by authentication, against any attack aimed at modifying its content.

For example, when the data broadcast are scrambled according to the customary principle of pay television, the keys or "control words" CW which served to scramble the data are inserted into the data, in control messages generally denoted "ECM" (acronym standing from "Entitlement Control Message"). The ECM messages are themselves encrypted with the aid of another key K, this key K being provided to the users having the right to access the data. In a preferred embodiment of the invention, the item PPVR_data is inserted into the ECM messages included in the data. It is thus protected in a manner as reliable as the scrambling keys CW.

In another embodiment, it is assumed that the data transmitted are in a format defined by the MPEG2 standard and broadcast according to the DVB standard, the item PPVR_data is in this case included in event descriptors which are defined more precisely in the DVB-SI (ETSI EN 300 468) standard.

We shall now describe more precisely the process which is implemented in the CA module 11 of the digital decoder to determine whether the data received by the decoder can be offered to the user in PPVR mode. We refer for this to FIG. 2.

Figure 2:
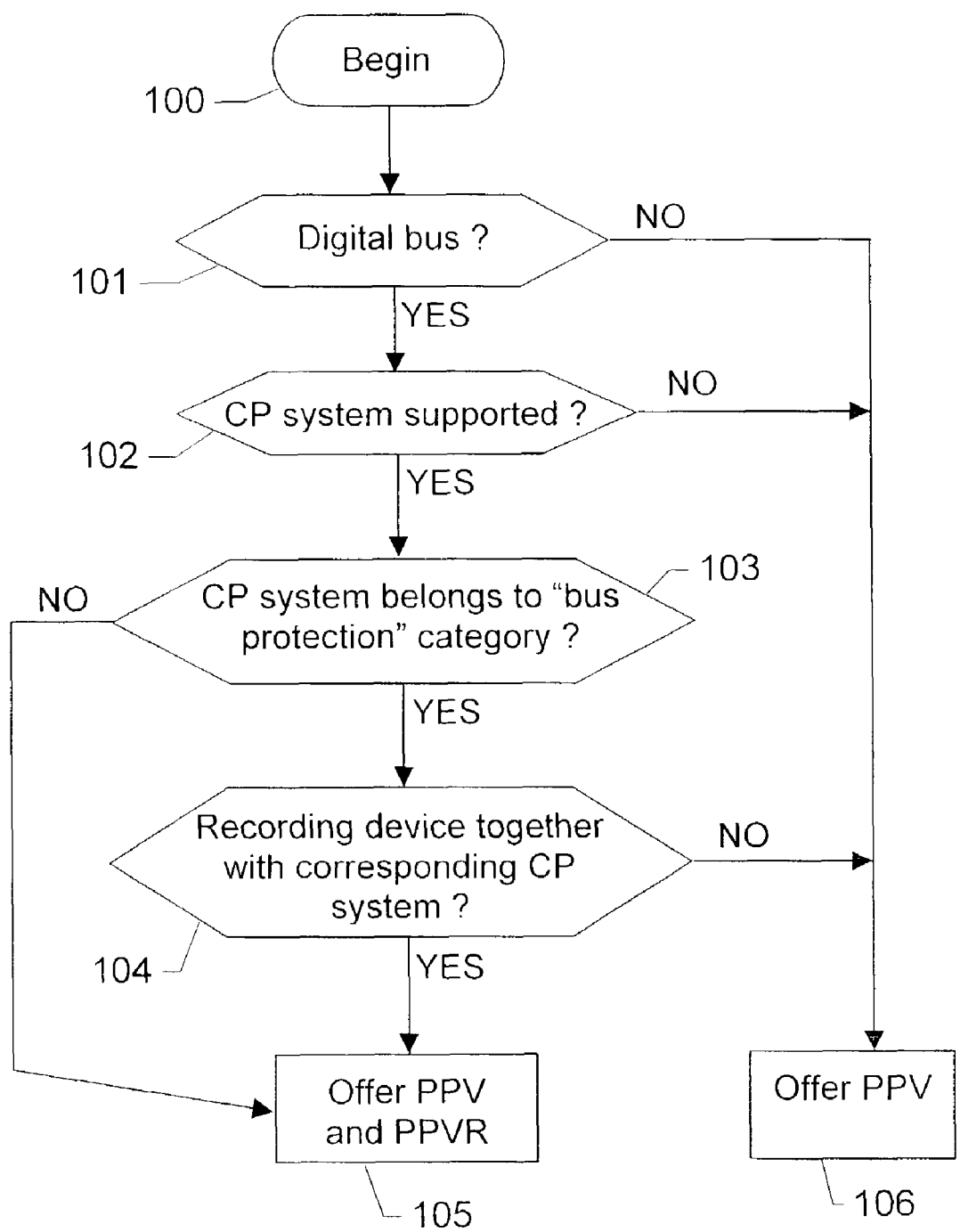
FIG. 2 is a flowchart illustrating an embodiment of the invention.

The steps illustrated in FIG. 2 are implemented by the CA module 11 of the decoder 1 when it receives data containing an item PPVR_data such as described hereinabove.

After a begin step 100, the CA module verifies in step 101 whether the decoder is equipped with a port for accessing a digital bus. If the decoder possesses a port for accessing a digital bus like the output port 16, then the CA module goes to step 102. Otherwise, it goes to step 106.

In step 102, it verifies whether at least one of the anticopy protection systems regarded as reliable by the data broadcaster is supported by the decoder. That is to say it verifies whether at least one of the values CP_reference of the item PPVR_data is included in the list contained in the CP memory 15. If it finds at least one value which is common between the values CP_reference of the item PPVR_data and the list of the CP memory, then the CA module goes to step 103, otherwise it goes to step 106.

In step 103 it verifies whether the anticopy protection system supported by the decoder and by the content broadcaster belongs to the category of the "protection of the bus" systems connecting appliances together It was seen earlier in the description that there are two major categories of anticopy protection systems:

- systems ensuring a "protection of the link" (or "protection of the bus") connecting appliances together; for example the DTCP system already cited; and
- so-called "end-to-end" protection systems in which the data are protected from their entry into a digital network up to the moment they are restored to the user; for example the SmartRight™ system cited above.

The category to which each anticopy protection system belongs is preferably stored, together with the reference number of the system, in the CP memory 15 of the decoder 1.

If the test 103 is negative (the system is of the "end-to-end protection" type), then we go to step 105.

On the other hand if the test 103 is positive (the system is of the "protection of the bus" type), it is then necessary, in order for protection to be ensured up to the end, to verify that the recording device capable of recording the data received likewise possesses a module implementing the same anticopy protection system as the decoder 1.

To do this we go to step 104 during which the CA module requests the digital bus interface 14 to send it the list of recording devices available on the bus as well as the anticopy protection systems which they support. For each listed recording device, it verifies whether at least one protection system corresponds to that (or to one of those) of the decoder. If it finds at least one recording device which corresponds, it then goes to step 105, otherwise it goes to step 106.

In step 106, the CA module requests the user interface 12 to offer the content received in PPV mode at the price corresponding to the value contained in PPV_price.

In step 105, the CA module requests the user interface 12 to offer the content received either in PPV mode, at the price corresponding to the value contained in PPV_price, or in PPVR mode, at the price corresponding to the value contained in PPVR_price.

The user interface 12 subsequently returns the response of the user to the CA module 11 which verifies it. If the user has selected the PPV mode, then the CA module requests the CP module 13 to broadcast the data in a protected manner by associating the "copy never" state with them.

If the user has selected the PPVR mode, then the CA module 11 lists all the recording devices available on the bus and which are suitable for recording (that is to say when the test 104 has been performed, the CA module 11 offers only the devices which have an anticopy protection system corresponding with that of the decoder) and requests the user interface to display this list. After receipt of the user's choice, the CA module requests the CP module 13 to broadcast the data in a manner protected according to the selected anticopy protection system (that of the decoder determined in step 102 or that which is common to the decoder and to the recording device selected by the user in step 104) and together with the associated state defined in the field CP_state.

The CP module then requests the digital bus interface 14 to send a request to the recording device selected by the user so that he records the broadcast data.

In a variant embodiment of the invention, provision may be made to desynchronize the content viewing decision from the content recording decision. Specifically, if all the conditions required in order for the PPVR mode to be offered to the user are satisfied, it is possible in step 105 to offer the suggestion that the user view the content for payment of the price PPV_price with possibility, on completion of viewing, of purchasing the content so as to record it for payment of the extra PPVR_price–PPV_price. The user can thus decide to pay a higher price to record the content after having viewed it.

In a particular embodiment, it is assumed that the digital decoder contains a hard disk allowing the recording of digital data. It is assumed in this case that a digital bus inside the decoder is provided for connecting the hard disk (corresponding to the digital video recorder 2 of FIG. 1) to the interface 14. In step 105 of FIG. 2, the user interface 12 offers the suggestion that the user view the content for payment of the price PPV_price. If the user agrees to this suggested offer, then the data are broadcast in a protected manner as seen above and are recorded at the same time on the hard disk in a format specific to the broadcaster of the content. On completion of this broadcast, the user interface suggests the purchase of the content so that the user can view it as often as he wants in exchange for the payment of an amount corresponding to the difference PPVR_price–PPV_price. If the user agrees, the CP module of the digital decoder modifies the content which has been recorded on the hard disk so that the latter is protected by the anticopy protection system selected previously together with an associated state defined in the field CP_state.

The invention claimed is:

1. Process for receiving data representative of a content comprising the steps of:
(a) receiving data in a receiver device, said data containing at least one anticopy protection system identifier associated with a corresponding anticopy protection system;
(b) verifying whether the receiver device is connected to a data recording device by an external digital bus; and in case of positive verification:
(c) verifying whether the receiver device comprises a module implementing an anticopy protection system whose identifier is included in said data where said at least one anticopy protection system is implemented using said digital bus; and in case of positive verification:
(d) offering a user access to said data according to a first mode of access authorizing the recording of said data; and
in case of negative verification in step (b) or step (c):
(e) offering a user access to said data according to a second mode of access not authorizing the recording of said data.

2. Process according to claim 1, furthermore comprising the steps of, in case of positive verification in step (c):
i) verifying whether said anticopy protection system belongs to a first category of systems using a mode of protection specific to the digital bus connecting said first device to said recording device, and in case of positive verification:
ii) verifying whether at least one recording device to which said first device is connected comprises a module implementing the same anticopy protection system;
step (d) being implemented in case of positive verification in step (ii) or in the case of negative verification in step (i);
and step (e) being implemented in case of negative verification in step (ii).

3. Process according to claim 1, furthermore comprising, during step (d), offering the user access to said data according to the second mode of access not authorizing the recording of the data.

4. Process according to claim 1, wherein an option of purchase of the data according to the first mode of access to said data is offered to the user after a presentation of the data to the user.

5. Process according to claim 1, wherein access to the data according to the first mode of access is offered in return for the payment of a price corresponding to a first amount included in a first field contained in said data.

6. Process according to claim 5, wherein access to the data according to the second mode of access is offered in return for the payment of a price corresponding to a second amount included in a second field contained in said data.

7. Process according to claim 6, wherein the second amount is less than the first amount.

8. Process according to claim 1, wherein the anticopy protection system identifier is included in a part of the received data which is protected by encryption or by authentication.

9. Process according to claim 1, wherein the data is broadcast, when the user selects the mode of access offered in step (d), with an associated state which is defined in a third field included in said data.

10. The process of claim 1, wherein in step c, the verification step determines said module operates with said anticopy protection system from a plurality of anticopy protection systems.

11. The process of claim 4, wherein said recorded data is recorded to a medium in a protected format of said anticopy protection system.

12. The process of claim 2, wherein the anticopy protection system comprises re-encrypting data before transmission over the digital bus.

13. The process of claim 1, wherein said receiver device and said data recording device are separate devices.

* * * * *